United States Patent
Ogino

(10) Patent No.: US 12,182,459 B2
(45) Date of Patent: Dec. 31, 2024

(54) IMAGE FORMING APPARATUS AND DISPLAY CONTROL METHOD

(71) Applicant: SHARP KABUSHIKI KAISHA, Sakai (JP)

(72) Inventor: Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/369,341

(22) Filed: Sep. 18, 2023

(65) Prior Publication Data

US 2024/0103778 A1 Mar. 28, 2024

(30) Foreign Application Priority Data

Sep. 28, 2022 (JP) .................. 2022-155024

(51) Int. Cl.
*G06F 3/12* (2006.01)

(52) U.S. Cl.
CPC ............ *G06F 3/1207* (2013.01); *G06F 3/121* (2013.01); *G06F 3/1235* (2013.01); *G06F 3/1258* (2013.01); *G06F 3/1259* (2013.01)

(58) Field of Classification Search
USPC ........................................ 358/1.14
See application file for complete search history.

(56) References Cited

U.S. PATENT DOCUMENTS 6,327,051 B1 * 12/2001 Moro ............... G06K 15/021
358/1.9
2015/0055175 A1 * 2/2015 Iida .................. G06F 3/1205
358/1.15

FOREIGN PATENT DOCUMENTS

JP 2005-178241 A 7/2005

\* cited by examiner

*Primary Examiner* — Jacky X Zheng
(74) *Attorney, Agent, or Firm* — ScienBiziP, P.C.

(57) ABSTRACT

An image forming apparatus according to an embodiment includes: a display which displays an information screen on which operation statuses of the apparatus are aggregated; and one or more processors which execute display control on the display, in which the one or more processors execute display control of an apparatus configuration diagram depicting an outer appearance of the apparatus on the information screen, on the basis of a detection result of execution of a job related to image formation.

8 Claims, 18 Drawing Sheets

FIG. 3A

| JOB MANAGEMENT TABLE | | | | | | |
|---|---|---|---|---|---|---|
| JOB ID | SET TIME | JOB TYPE | USER NAME | NUMBER OF SETS | IMAGE DATA | STATUS |
| 0101 | 2020/04/01 14:10 | COPY | User_1 | 0200 | /MFP/ADF/003256769.jpg | WAITING |
| 0100 | 2020/04/01 14:05 | COPY | User_1 | 0200 | /MFP/ADF/003256765.pdf | COPYING |
| ⋮ | ⋮ | ⋮ | ⋮ | ⋮ | ⋮ | ⋮ |

FIG. 3B

| JOB HISTORY TABLE | | | | | |
|---|---|---|---|---|---|
| HISTORY ID | JOB ID | SET TIME | JOB TYPE | USER NAME | STATUS |
| 0099 | 0099 | 2020/04/01 13:55 | COPY | User_1 | OK |
| 0098 | 0098 | 2020/04/01 13:31 | COPY | User_1 | OK |
| 0097 | 0097 | 2020/04/01 13:30 | PRINT | User_1 | OK |
| 0096 | 0096 | 2020/04/01 13:25 | PRINT | User_2 | OK |
| 0095 | 0095 | 2020/04/01 13:23 | PRINT | User_1 | OK |
| 0094 | 0094 | 2020/04/01 11:42 | PRINT | User_3 | OK |
| 0093 | 0093 | 2020/04/01 10:40 | PRINT | User_2 | OK |
| 0092 | 0092 | 2020/04/01 10:30 | PRINT | User_1 | OK |
| 0091 | 0091 | 2020/04/01 10:07 | COPY | User_3 | OK |
| ⋮ | ⋮ | ⋮ | ⋮ | ⋮ | ⋮ |

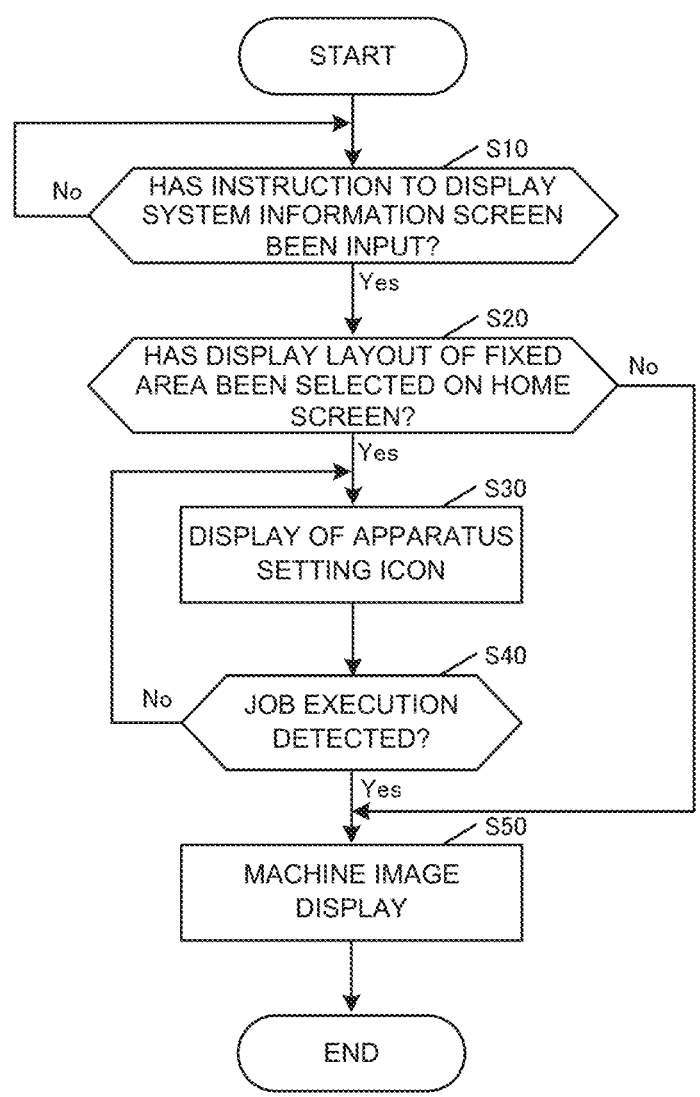

IMAGE FORMING APPARATUS AND DISPLAY CONTROL METHOD

BACKGROUND OF THE INVENTION

Field of the Invention

The present disclosure relates to, for example, an image forming apparatus.

Description of the Background Art

As image forming apparatuses such as multifunction peripherals, apparatuses which aggregate apparatus information regarding the operation status of the apparatus, such as consumables information regarding the remaining amount of consumables and state information regarding the state of the apparatus, and display such information as an information screen are known. The information screen can be set as an initial screen to be presented at the time of activation of the apparatus. Also, the information screen is configured to be callable via various display screens, such as a basic screen that receives switching of an execution mode of a job, etc., and a setting screen based on each execution mode such as copy, and acquisition of the apparatus information at an arbitrary timing is easy. For this reason, the information screen is one of the display screens to be highly frequently referred to by a user.

Incidentally, some of the image forming apparatuses include apparatuses that display, in an apparatus configuration diagram depicting an outer appearance of the apparatus, a situation of paper conveyance in the apparatus and a portion where abnormality such as a jam has occurred. By referring to the apparatus configuration diagram displayed on a display device, the user can visually image the situation of paper conveyance and the portion where the abnormality has occurred and ascertain the apparatus state.

For example, as indicated in a conventional technology, there is known a display device of an image forming apparatus which displays, on an operation panel, an apparatus configuration diagram and a conveyance state of paper conveyed from each paper feed cassette to be superimposed on the apparatus configuration diagram, and displays, when occurrence of a jam has been detected, the position of occurrence of the jam.

By enabling display of the apparatus configuration diagram which is excellent in visual notification effect on the information screen as well, it is expected that the user will be able to acquire appropriate apparatus information corresponding to the state of the apparatus. However, no attempts have been made so far to achieve a configuration in which an apparatus configuration diagram is enabled to be displayed over an information screen. For example, in a case where a job related to printing or copying is executed while an information screen is being displayed, when a user wishes to confirm a paper feed tray, which is the paper feed source for paper, the user is required to confirm the paper feed source by, for example, temporarily switching the display screen to a setting screen related to each execution mode related to printing, copying, or the like.

The display device related to the conventional technology displays a paper conveyance situation, occurrence of a jam, etc., as the apparatus configuration diagram. However, the user is required to operate a display mode switching key displayed on the operation panel to switch from a normal display mode, which is a normal apparatus display, to a paper conveyance display mode related to display of the apparatus configuration diagram. Thus, the display device of the conventional technology is not a device that is excellent in operability.

An object of the present disclosure is to provide an image forming apparatus and the like which can provide appropriate apparatus information corresponding to the state of the apparatus by performing control of the display of the apparatus configuration diagram.

SUMMARY OF THE INVENTION

In order to solve the above problem, an image forming apparatus according to the present disclosure includes: a display which displays an information screen on which operation statuses of the apparatus are aggregated; and one or more processors which execute display control on the display, and the image forming apparatus is characterized in that the one or more processors execute display control of an apparatus configuration diagram depicting an outer appearance of the apparatus on the information screen, on the basis of a detection result of execution of a job related to image formation.

Further, a display control method according to the present disclosure pertains to a display control method including: displaying, on a display device, an information screen on which operation statuses of an apparatus are aggregated; and executing display control on the display device, and the display control method is characterized by executing display control of an apparatus configuration diagram depicting an outer appearance of the apparatus on the information screen, on the basis of a detection result of execution of a job related to image formation.

According to the present disclosure, it is possible to provide an image forming apparatus which can provide appropriate apparatus information corresponding to the state of the apparatus by performing control of the display of the apparatus configuration diagram.

BRIEF DESCRIPTION OF THE DRAWINGS

FIG. 3A is a table illustrating a job management table.
FIG. 3B is a table illustrating a job history table.

FIG. 4 is a flowchart illustrating a flow of processing according to the first embodiment.

DESCRIPTION OF THE PREFERRED EMBODIMENTS

Embodiments of the present disclosure will be described below with reference to the accompanying drawings. In the present disclosure, a multifunction peripheral capable of performing, in a single housing, jobs related to each execution mode such as copying, faxing, and image transmission is described as one form of an image forming apparatus. Note that the embodiments below are presented as examples for describing the present disclosure, and the technical scope of the description as recited in the appended claims is not limited by the following description.

Here, in the present disclosure, setting-related buttons for apparatus settings, such as brightness adjustment, volume, language settings, settings, large text mode, and total paper usage display, and notifiers that notify a user of information that is related to items other than those related to settings, such as consumables information and the apparatus state, via a chart, character strings, a symbol, and the like, are collectively referred to as apparatus setting items. Further, in the present disclosure, a display area which exclusively displays the apparatus setting items and whose display position is fixed is referred to as a fixed area.

1. First Embodiment

A first embodiment corresponds to an embodiment including: a display which displays an information screen on which operation statuses of an apparatus are aggregated; and a controller which enables display control on the display, in which the controller controls, on the basis of a detection result of execution of a job related to image formation, display of an apparatus configuration diagram depicting an outer appearance of the apparatus on the information screen. In particular, as the first embodiment, a mode of controlling the display of the apparatus configuration diagram according to whether a layout pattern that displays a fixed area is selected or not on a home screen, which serves as a basic screen for receiving selection of a job execution mode and the like, will be described.

1.1 Functional Configuration

Figure 1:
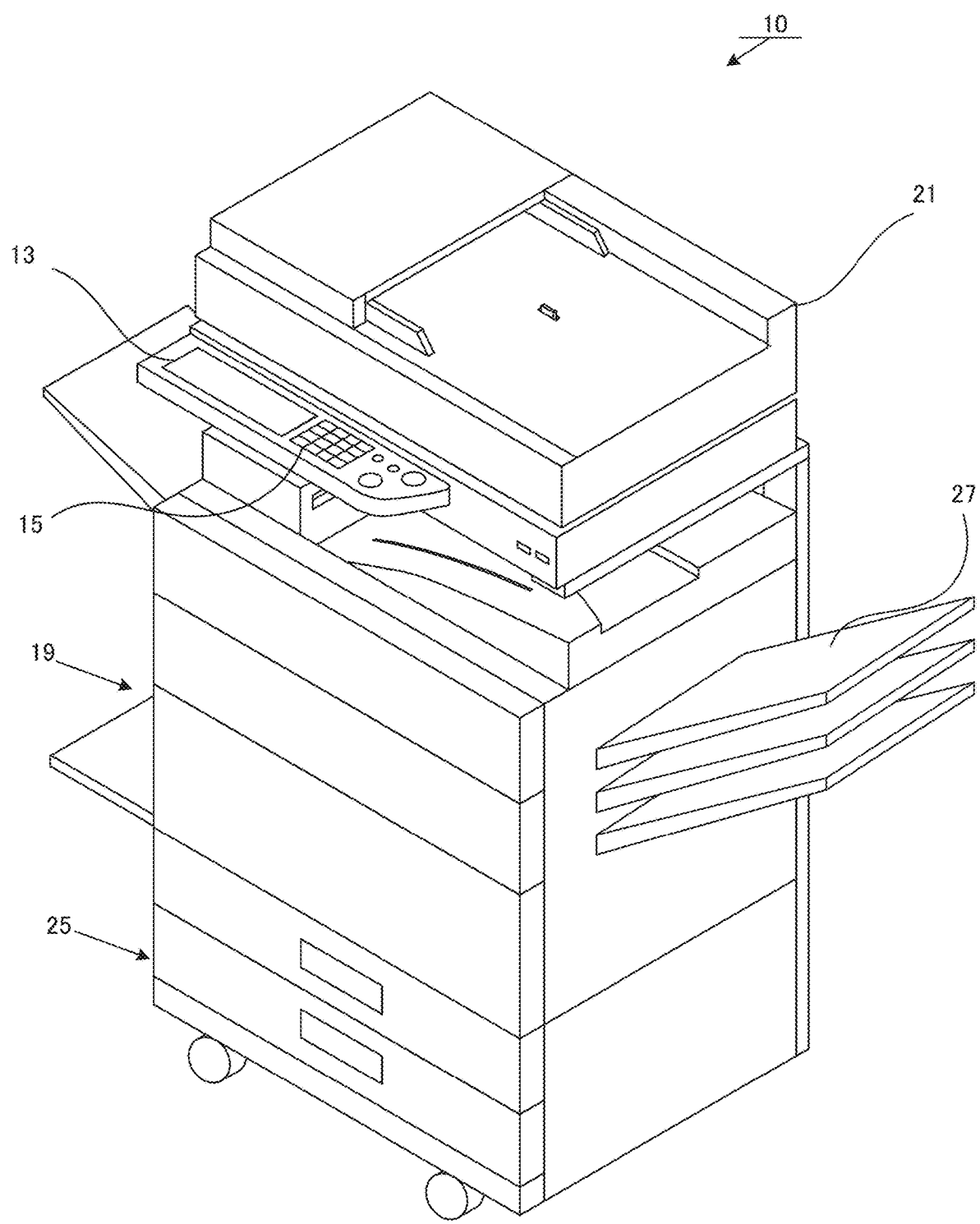
FIG. 1 is an external perspective view of a multifunction peripheral according to a first embodiment.
Figure 2:
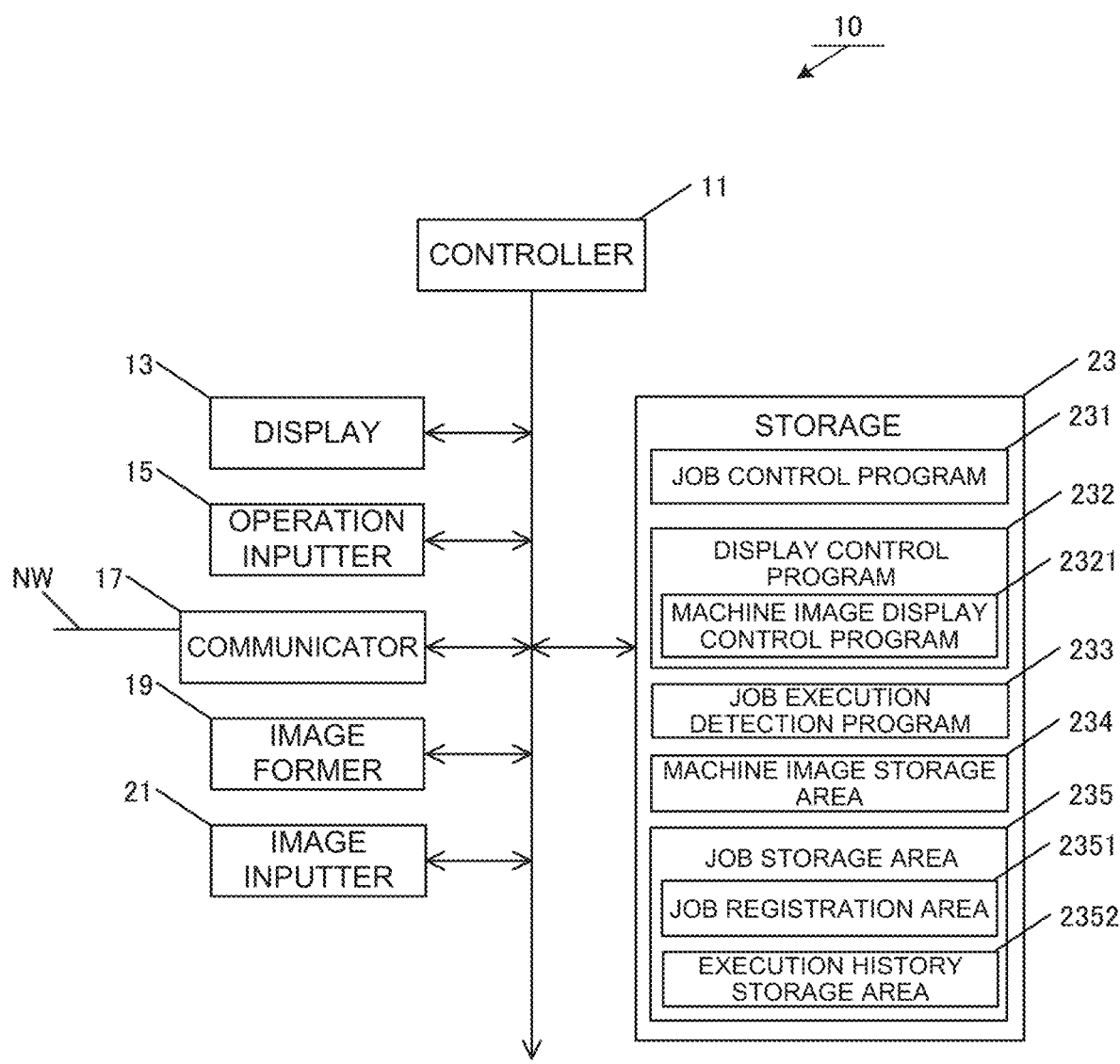
FIG. 2 is a functional configuration diagram of the multifunction peripheral according to the first embodiment.

A functional configuration of a multifunction peripheral 10 according to the first embodiment will be described with reference to FIGS. 1 and 2. FIG. 1 is an external perspective view which schematically illustrates an overall configuration of the multifunction peripheral 10. FIG. 2 is a functional configuration diagram of the multifunction peripheral 10. The multifunction peripheral 10 is provided with a controller 11, a display 13, an operation inputter 15, a communicator 17, an image former 19, an image inputter 21, and a storage 23.

The controller 11 controls the multifunction peripheral 10 as a whole. The controller 11 is composed of, for example, one or more arithmetic devices (such as processors, central processing units [CPUs]). The controller 11 reads and executes various programs stored in the storage 23, thereby implementing functions thereof.

The display 13 displays various kinds of information to a user or the like. The display 13 can be composed of, for example, a liquid crystal display (LCD) or an organic electro-luminescence (EL) display.

The operation inputter 15 receives input of information by the user or the like. The operation inputter 15 can be configured from, for example, a hard key (e.g., a numeric keypad), buttons, and the like. The operation inputter 15 can be configured as a touch panel that allows input to be made via the display 13. In this case, for example, a common method such as a resistive method, an infrared method, an electromagnetic induction method, or a capacitive sensing method may be employed as an input method for the touch panel.

The communicator 17 is provided with either of or both of wired and wireless interfaces to communicate with other devices via a network (NW) such as a local area network (LAN), a wide area network (WAN), the Internet, a telephone line, or a fax line.

The image former 19 forms, on paper or the like as a recording medium, an image based on image data. The image former 19 feeds paper from a paper feeder 25, forms an image based on image data on the paper, and then discharges the paper to a paper discharger 27. The image former 19 can be composed of, for example, a laser printer using an electrophotographic method. In this case, the image former 19 forms an image by using toners supplied from toner cartridges, which are not illustrated, corresponding to respective toner colors (e.g., cyan, magenta, yellow, and black).

The image inputter 21 scans and reads a document, thereby generating image data. The image inputter 21 can be configured, for example, as a scanner device provided with an image sensor, such as a charge-coupled device (CCD), a contact image sensor (CIS), or the like, and including an automatic document feeder (ADF) and a flat bed, etc., for placing a document thereon and reading the document. As long as the image inputter 21 is configured to generate image data by reading a reflected light image from a document image with the image sensor, a configuration thereof is not particularly limited. The image inputter 21 can also be configured as an interface which can acquire, for example, image data stored in a portable storage medium such as a Universal Serial Bus (USB) memory, or image data transmitted from an external device (not illustrated).

The storage 23 stores therein various kinds of data and various programs necessary for operation of the multifunction peripheral 10. The storage 23 can be configured from, for example, storage devices such as a random-access memory (RAM), a hard disk drive (HDD), a solid state drive (SSD), and a read-only memory (ROM).

In the first embodiment, the storage 23 stores a job control program 231, a display control program 232, and a job execution detection program 233, and reserves a machine image storage area 234 and a job storage area 235.

The job control program 231 is a program that the controller 11 reads in order to perform processing related to each execution mode such as printing, copying, scanning, faxing, Internet Fax, and the like, on a job-by-job basis. The controller 11 that has read the job control program 231 executes a job by controlling the display 13, the operation inputter 15, the communicator 17, the image former 19, the image inputter 21, and the like. Also, the controller 11 that has read the job control program 231 executes, holds, or stops a job, registers a job into or deletes a job from a job management list (a job queue) which will be described later, manages job histories in a job history table, and the like.

The display control program 232 is a program that the controller 11 reads in controlling a display screen to be displayed via the display 13. The controller 11 that has read the display control program 232 displays, on the display 13, a home screen which receives selection of a job execution mode and the like, a setting screen (not illustrated) for receiving input of various setting values related to job execution, a system information screen as an information screen to be described later, a machine image, etc., as an apparatus configuration diagram, and the like. Also, the display control program 232 includes a machine image display control program 2321. The controller 11 that has read the machine image display control program 2321 performs determination processing necessary for displaying a machine image and display control of the machine image on the basis of the determination processing. For example, the controller 11 that has read the machine image display control program 2321 performs control to restrict the display of a machine image and display an apparatus setting icon corresponding to the apparatus setting item when a layout pattern that displays the fixed area is selected on the home screen and execution of a job related to image formation is not detected, and to display a machine image at a display position of the apparatus setting icon when execution of a job related to image formation is detected.

The job execution detection program 233 is a program that the controller 11 reads in detecting execution of a job. The controller 11 that has read the job execution detection program 233 detects execution of a job related to printing, copying, scanning, faxing, Internet Fax, and the like. The controller 11 that has read the job execution detection program 233 may detect execution of a job on the basis of a job start signal output by execution of the job control program 231. Further, in a case where a job to be detected involves a printing operation of printing on paper or a reading operation of reading a document, for example, the controller 11 can also detect execution of a job on the basis of a detection signal output according to a situation in which paper is conveyed or a situation in which a document is set at a reading position.

The machine image storage area 234 is a storage area for storing a machine image file to be displayed by the controller 11 that has read the machine image display control program 2321 on the display 13 as the machine image.

The job storage area 235 includes a job registration area 2351 for registering and managing jobs to be executed and an execution history storage area 2352 which stores histories of execution of the jobs as job history. The job registration area 2351 manages the jobs related to printing, copying, scanning, faxing, or Internet Fax, and the like, on the basis of a job management table. Also, the execution history storage area 2352 manages the histories of execution on executed jobs on the basis of a job history table.

Here, the job management table and the job history table will be described with reference to FIGS. 3A and 3B. FIG. 3A is a table illustrating a configuration example of a data structure of the job management table. FIG. 3B is a table illustrating a configuration example of a data structure of the job history table. In FIGS. 3A and 3B, a job related to copying and printing (a print job) will be described as an example of a job type.

The job management table illustrated in FIG. 3A includes, as management items, Job ID, Set time, Job type, User name, Number of sets, Image data, and Status. Job ID is an identifier to uniquely identify the registered job. Set time indicates the time when the job has been set. In this case, the Set time can be the time when an instruction to execute a copy job has been input, or the Set time may alternatively be the time when a document to be copied has been set to the image inputter 21 (e.g., a scanner device). Job type indicates the type of the job in question. User name indicates the name of a user who has executed the job. If the user who has executed the job is uncertain (e.g., a job of making a small number of copies by directly operating the multifunction peripheral 10), this management item may be left blank. Number of sets indicates the number of copies to be made. Image data indicates a storage location (a file path) of the image data to be applied as an original image of the copy. Status indicates the status of execution of the job in question by indicating, for example, "waiting", "copying", etc.

For example, a job identified by the job ID "0101" indicates that the job corresponds to a copy job pertaining to the job type "copy", which has been set at the set time "2020/04/01 14:10". The aforementioned copy job is an example in which 200 copies (Number of sets "0200") are set by the user with the user name "User_1", by using the image data "/MFP/ADF/003256789.jpg" as the original image of the copy. Further, the status of the copy job pertaining to job ID "0101" is "waiting".

The job history table illustrated in FIG. 3B includes, as history items, History ID, Job ID, Set time, Job type, User name, and Status. History ID is generated each time a job is executed (completed), and is an identifier to uniquely identify each job history. Job ID is an identifier to uniquely identify the registered job, and the identifier is the same as the identifier of the job ID related to FIG. 3A. FIG. 3B shows an example of the case in which the history ID and the job ID take on the same identifier value. However, it is of course acceptable if the history ID and the job ID take on different values as in the case in which, for example, the order of registration of jobs (job ID) and the order of execution of the jobs (history ID) are different. Set time indicates the time when the job has been set, and is identical to the Set time related to FIG. 3A. Job type and User name are also identical to the Job type and the User name exemplified in FIG. 3A in terms of the values. Status indicates the status of execution of the job in question by indicating, for example, "OK" meaning that the job is completed.

For example, a job history identified by the history ID "0099" (Job ID "0099") indicates that the job history corresponds to a copy job pertaining to the job type "copy", which has been set at the set time "2020/04/01 13:55". The aforementioned copy job is set by the user with the user name "User_1", and the status of the copy job pertaining to this history ID "0099" is "OK", i.e., completed.

The controller 11 that has read the job control program 231 can display a job list of the corresponding jobs on the system information screen as the information screen, on the basis of the management items of the job management table and the history items of the job history table.

1.2 Flow of Processing

Next, a flow of processing of the first embodiment will be described with reference to a flowchart of FIG. 4. The processing described with reference to FIG. 4 is that executed by the controller 11 as the controller 11 reads the job control program 231, the display control program 232 (the machine image display control program 2321), the job execution detection program 233, and the like.

First, the controller 11 determines whether or not an instruction to display a system information screen has been input via a home screen or the like (step S10). If it is determined that an instruction to display a system information screen has been input, the controller 11 determines whether or not a display layout of the fixed area is selected on the home screen (step S10; Yes→step S20). Meanwhile, if it is determined that no instruction to display the system information screen has been input, the controller 11 waits until an instruction to display the system information screen is input (step S10; No).

If it is determined that a display layout of the fixed area is selected on the home screen, the controller 11 displays an apparatus setting icon display area on the system information screen (step S20; Yes→step S30). Next, the controller 11 determines whether or not execution of a job is detected (step S40). If it is determined that execution of a job is detected, the controller 11 displays a machine image on the system information screen and ends the processing (step S40; Yes→step S50). Meanwhile, if it is determined that job execution is not detected, the controller 11 continues to display the apparatus setting icon display area (step S40; No→step S30).

Incidentally, if it is determined that a display layout of the fixed area is not selected on the home screen, the controller 11 displays a machine image on the system information screen and ends the processing (step S20; No→step S50).

1.3 Operation Examples

Figure 5:
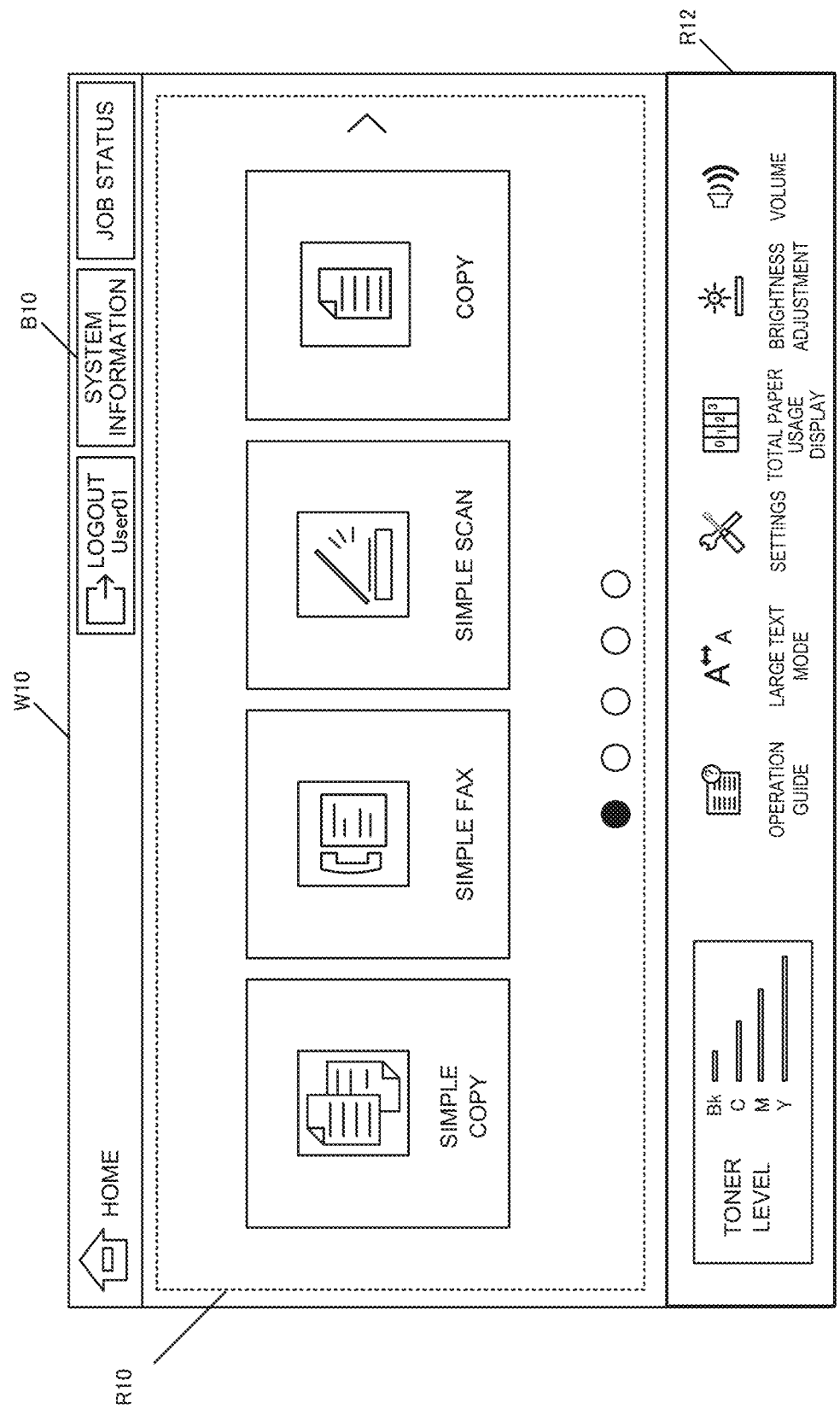
FIG. 5 is a diagram illustrating an operation example according to the first embodiment.

Next, operation examples according to the first embodiment will be described. FIG. 5 is a diagram illustrating a configuration example of a home screen W10 which receives selection of a job execution mode and the like, and is a diagram illustrating an example of a mode in which a display layout of the fixed area is selected. The home screen W10 exemplified in FIG. 5 can be configured as a basic screen that is displayed on the display 13 when, for example, the multifunction peripheral is powered on, is in standby mode, or is recovered from a sleep mode, and receives operation input from the user. The home screen W10 includes a function menu button display area R10, a fixed area display area R12, and a system information button B10.

The function menu button display area R10 is a display area which displays function menu buttons to receive selection of a function menu. FIG. 5 illustrates an example which displays function menu selection buttons for simple copy, simple fax, simple scan, and copy, as the function menus. The user can select a job execution mode by selecting a desired function menu selection button. Note that the configuration example of the function menu selection buttons exemplified in the home screen W10 of FIG. 5 is merely an example, and the setting can be changed via a system setting screen or the like which is not illustrated.

The fixed area display area R12 is an area which displays the apparatus setting items on language settings, operation guide, maintenance, and the like, and is a display area whose display position is fixed. FIG. 5 illustrates an example which displays the apparatus setting items related to "Toner Level", "Operation Guide", "Large Text Mode", "Settings", "Total Paper Usage Display", "Brightness Adjustment", and "Volume". The display position of the fixed area display area R12 is not limited to the position exemplified in FIG. 5 (i.e., below the function menu button display area R10). That is, the fixed area display area R12 may be positioned, for example, above the function menu button display area R10, or on one of the right and left sides of the home screen W10.

The system information button B10 is a button which receives input of an instruction to display the system information screen as the information screen, which will be specifically described referring to the subsequent figures, for example. When input of an instruction to display the system information screen is received by selection of the system information button B10, the controller 11 displays the system information screen on the display 13.

Figure 6:
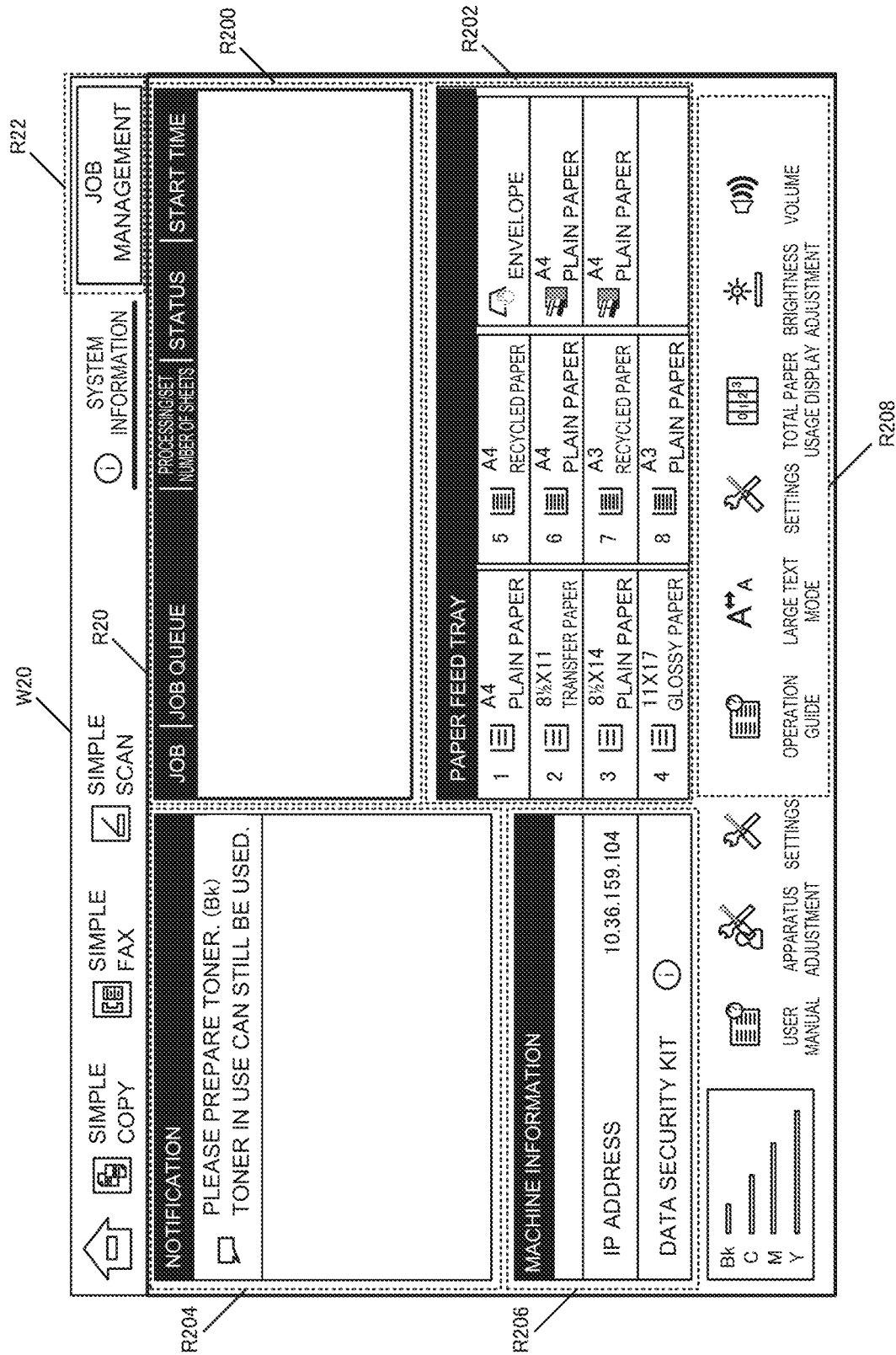
FIG. 6 is a diagram illustrating an operation example according to the first embodiment.

FIG. 6 is a diagram illustrating a configuration example of a system information screen W20 that is displayed by the controller 11 in response to selection of the system information button B10 on the home screen W10 exemplified in FIG. 5. The system information screen W20 exemplified in FIG. 6 is a display configuration example of the case in which after the apparatus setting icon has been displayed in step S30 of FIG. 4, no job execution is detected (step S30→step S40; No).

The system information screen W20 includes a system information display area R20 which aggregates and displays the operation statuses of the apparatus and a job management display area R22. The system information display area R20 includes: a job list display area R200 capable of displaying, as a job list, job queues related to a reserved job which is reserved to be executed, a job whose execution is detected, and a job being executed, for example, and histories of the executed jobs; a paper feed tray information area R202 which displays information on the size and remaining number of sheets of paper stored in a paper feed tray; a notification information display area R204 which displays notification information to the user; and a machine information display area R206 which displays machine information (apparatus information) on the multifunction peripheral 10.

The job management display area R22 can display information on job management such as the status of a job being executed and cancellation of the job being executed. A specific display mode of the job management display area R22 will be described referring to the subsequent figure.

Also, the system information screen W20 includes an apparatus setting icon display area R208. The apparatus setting icon display area R208 displays, when a display (layout) of the fixed area display area R12 is selected on the home screen W10 exemplified in FIG. 5, apparatus setting icons corresponding to the apparatus setting items that can be displayed in the fixed area display area R12. FIG. 6 illustrates an example which displays the apparatus setting icons related to "Operation Guide", "Large Text Mode", "Settings", "Total Paper Usage Display", "Brightness Adjustment", and "Volume". The apparatus setting icons to be displayed in the apparatus setting icon display area R208 may be apparatus setting icons completely corresponding to the apparatus setting items displayed in the fixed area display area R12 or may be apparatus setting icons corresponding to different apparatus setting items. In addition, it is also possible to set priorities to the apparatus setting items (icons) to be displayed, on the basis of the user's desire, the degree of importance of the setting content, and the like, and display a predetermined number of apparatus setting icons in descending order of priority (for example, in the order starting from the apparatus setting item with the highest priority). The display of the apparatus setting icon display area R208 can be selected to display a machine image display area, which will be described referring to the subsequent figure, in accordance with the detection of job execution.

Figure 7:
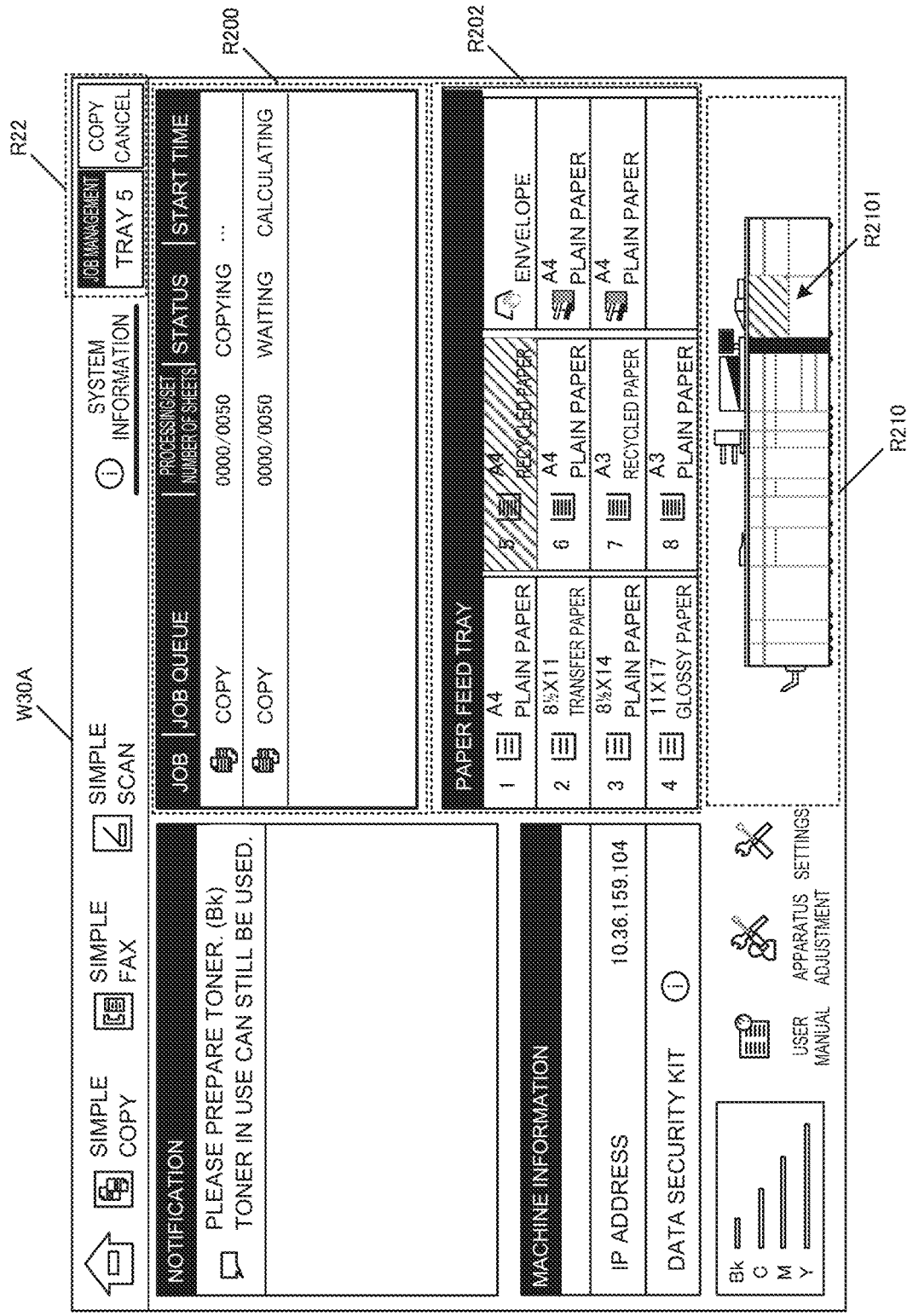
FIG. 7 is a diagram illustrating an operation example according to the first embodiment.

FIG. 7 is a diagram illustrating a display configuration example of a system information screen W30A in a case where job execution is detected. FIG. 7 shows an operation example corresponding to the processing related to when step S40 of FIG. 4 is "Yes" to step S50.

When job execution is detected, the controller 11 displays a job queue related to the detected job in the job list display area R200. FIG. 7 illustrates an example which displays, in the job list display area R200, a copy job whose execution is detected.

In the system information screen W30A, the controller 11 explicitly indicates the paper feed tray accommodating the paper to be used for copy in the detected copy job. In the paper feed tray information area R202, as the paper feed tray related to paper feeding, for example, tray 5 is displayed in a display mode different from that of the other paper feed trays. FIG. 7 shows, as the different display mode, a mode in which a display area corresponding to tray 5 is filled with a hatch pattern. As long as the display mode is that by which the paper feed tray related to paper feeding can be identified, the display color, the fill pattern, and the like, are not limited. The configuration position of the paper feed tray to be explicitly indicated may be represented by blinking of tray information, a different character font, a different character size, or the like, and the corresponding portion can also be guided by voice guidance.

In addition to explicit indication of the paper feed tray in the paper feed tray information area R202, the controller 11 displays a machine image in a machine image display area R210, in place of the display of the apparatus setting icon display area R208. In the machine image displayed in the machine image display area R210, a portion R2101 corresponding to the paper feed tray explicitly indicated in the paper feed tray information area R202 is highlighted. As is the case with the display mode of the paper feed tray in the paper feed tray information area R202, the display mode such as the display color and the fill pattern is not particularly limited as long as the paper feed tray related to paper feeding can be identified in the overall configuration of the apparatus. As described above, as an example of an acting portion associated with execution of a job (a copy job), a portion corresponding to the paper feed tray serving as a paper feed source for paper is highlighted in the machine image. By this feature, the user can easily ascertain the acting portion related to the job.

The controller 11 can display information on job management, such as the status of the job being executed and reception of an instruction to cancel the job being executed, in the job management display area R22. FIG. 7 illustrates an example which indicates that the paper feed source for paper related to the copy job is the paper feed tray (tray 5), and a copy cancellation button for receiving input of a copy cancellation instruction is displayed in the job management display area R22.

Figure 8:
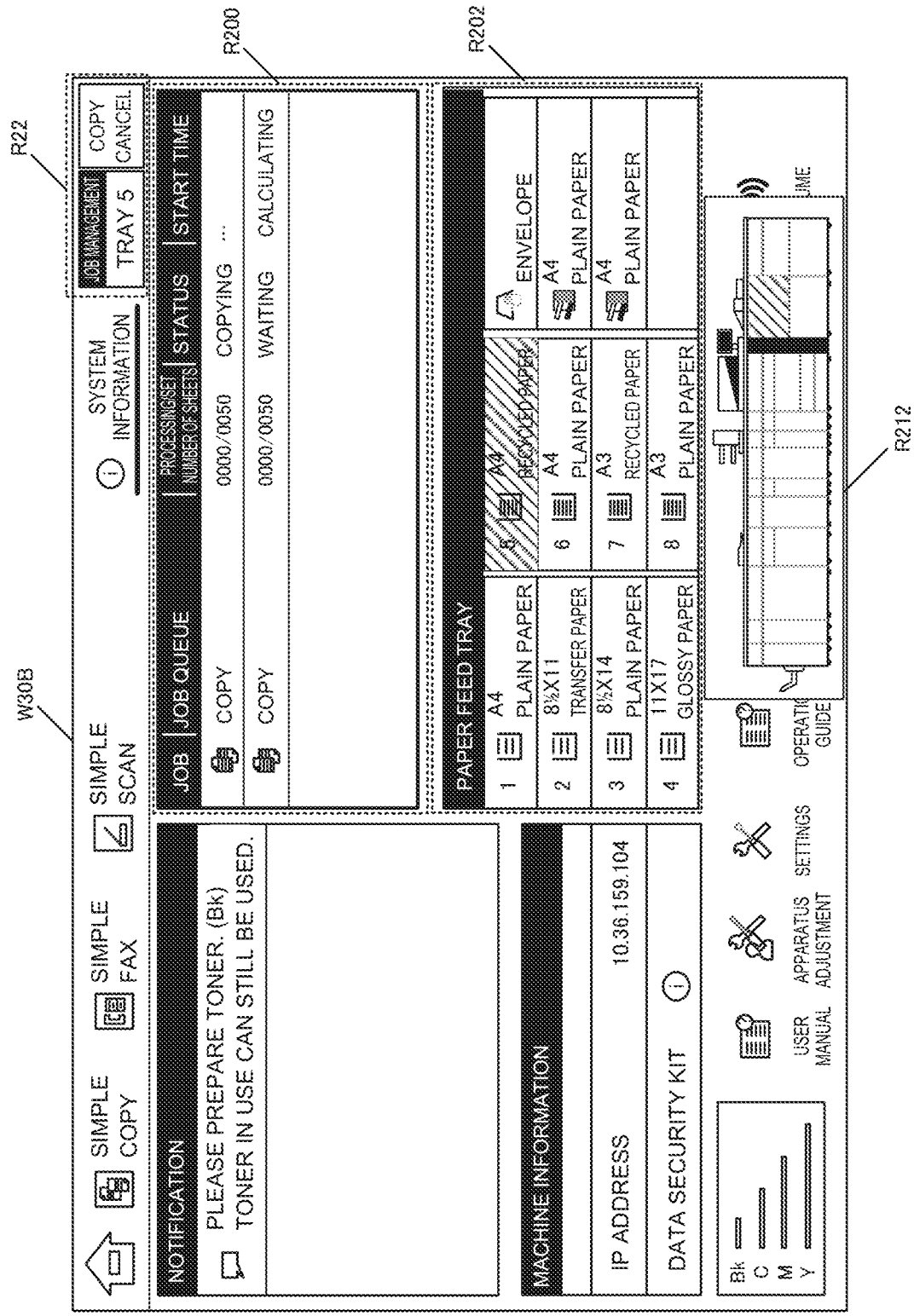
FIG. 8 is a diagram illustrating an operation example according to the first embodiment.

While FIG. 7 shows an embodiment in which the display of the apparatus setting icon display area R208 is switched to the display of the machine image display area R210 to display the machine image, the machine image display area R210 can alternatively be displayed such that the machine image display area R210 is superimposed on the apparatus setting icon display area R208. FIG. 8 illustrates an example of a system information screen W30B which displays a machine image display area R212 to be superimposed on the apparatus setting icon display area R208.

Incidentally, the display position of the machine image display area R210 exemplified in FIG. 7 or the machine image display area R212 exemplified in FIG. 8 is not limited to the position set as the display position of the apparatus setting icon display area R208. The machine image display area R210 or R212 may be displayed at a display position set as the other display areas, such as the paper feed tray information area R202, for example. Further, when the display of the machine image display area R210 or the machine image display area R212 is not necessary, it is also possible to, as a matter of course, hide the display portion of the machine image by a selection operation such as a double tap or a flick and cause the apparatus setting icon display area R208 to be displayed again.

As described above, according to the first embodiment, the display of the machine image is controlled in accordance with a selection status of the display layout of the fixed area on the home screen, on the basis of a detection result of the execution of a job related to image formation. Therefore, it is possible to provide an image forming apparatus which can provide appropriate apparatus information corresponding to the state of the apparatus.

2. Second Embodiment

A second embodiment corresponds to an embodiment in which, when execution of a job is detected in the first embodiment, an inquiry is made to the user whether to enable or disable display of a machine image.

2.1 Functional Configuration

Since a functional configuration of a multifunction peripheral according to the second embodiment can be made the same as that of the multifunction peripheral 10 according to the first embodiment, the functional configuration will not be described here.

2.2 Flow of Processing

Figure 9:
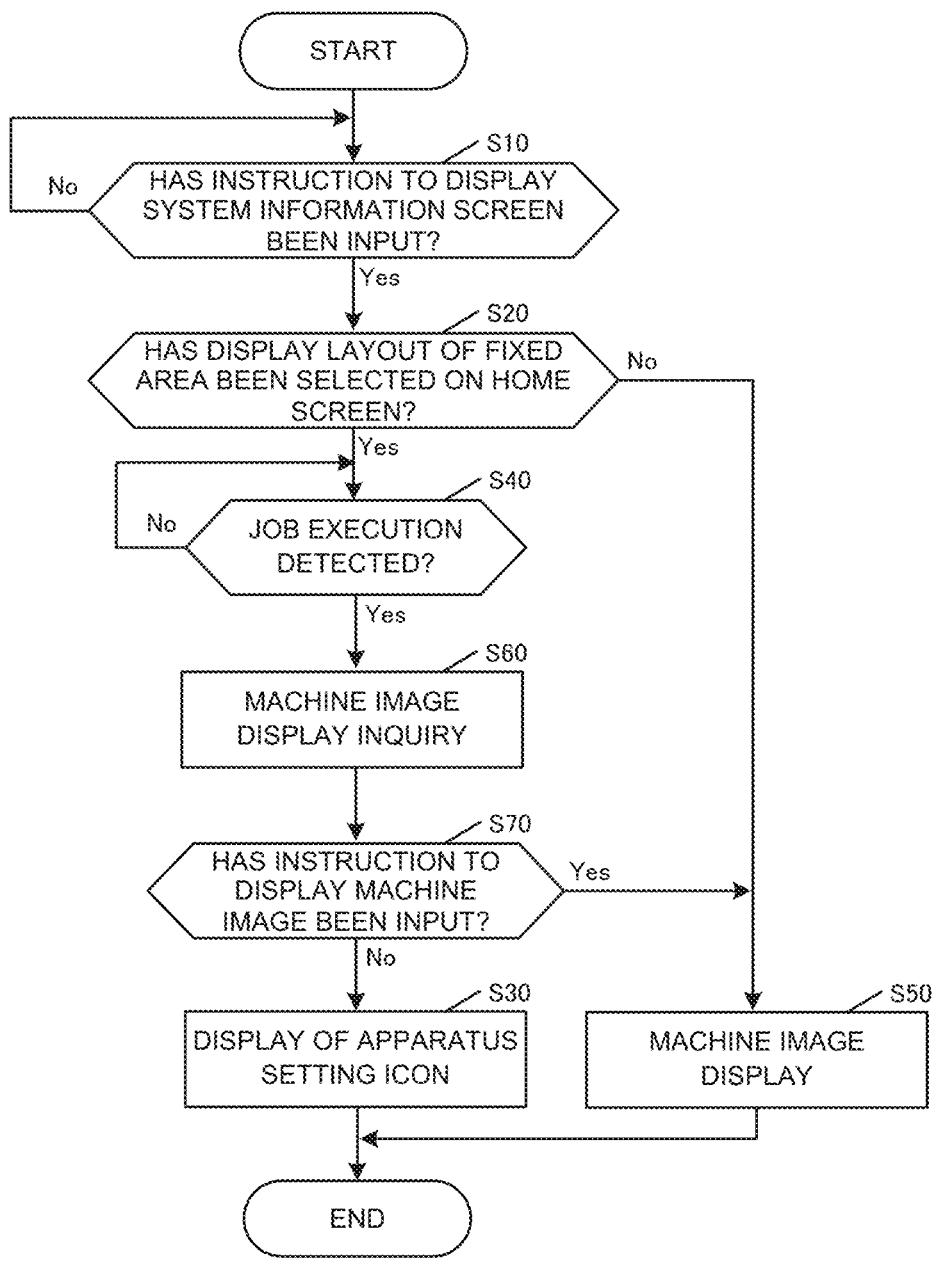
FIG. 9 is a flowchart illustrating a flow of processing according to a second embodiment.

A flow of processing of the second embodiment will be described with reference to a flowchart of FIG. 9. The processing according to the second embodiment is that obtained by replacing the processing of the flowchart of FIG. 4 described in the first embodiment with the flowchart of FIG. 9. Therefore, for parts that can be made the same as the processing described with reference to the flowchart of FIG. 4, the same step numbers as those of the flowchart of FIG. 4 are assigned.

First, a controller 11 determines whether or not an instruction to display a system information screen has been input via a home screen or the like (step S10). If it is determined that an instruction to display a system information screen has been input, the controller 11 determines whether or not a display layout of a fixed area is selected on the home screen (step S10; Yes→step S20). Further, if it is determined that no instruction to display the system information screen has been input, the controller 11 waits until an instruction to display the system information screen is input (step S10; No).

If it is determined that a display layout of the fixed area is selected on the home screen, the controller 11 determines whether or not execution of a job is detected (step S20; Yes→step S40). Meanwhile, if it is determined that a display layout of the fixed area is not selected on the home screen, the controller 11 displays a machine image on the system information screen and ends the processing (step S20; No→step S50).

In step S40, if it is determined that execution of a job is detected, the controller 11 displays an inquiry screen inquiring whether or not to display the machine image (step S40; Yes→step S60). Meanwhile, if it is determined that no job execution is detected, the controller 11 waits until job execution is detected (step S40; No).

If input of an instruction to display the machine image is received, the controller 11 displays the machine image and ends the processing (step S70; Yes→step S50).

Meanwhile, if no input of an instruction to display the machine image is received, the controller 11 displays an apparatus setting icon and ends the processing (step S70; No→step S30).

2.3 Operation Example

Figure 10:
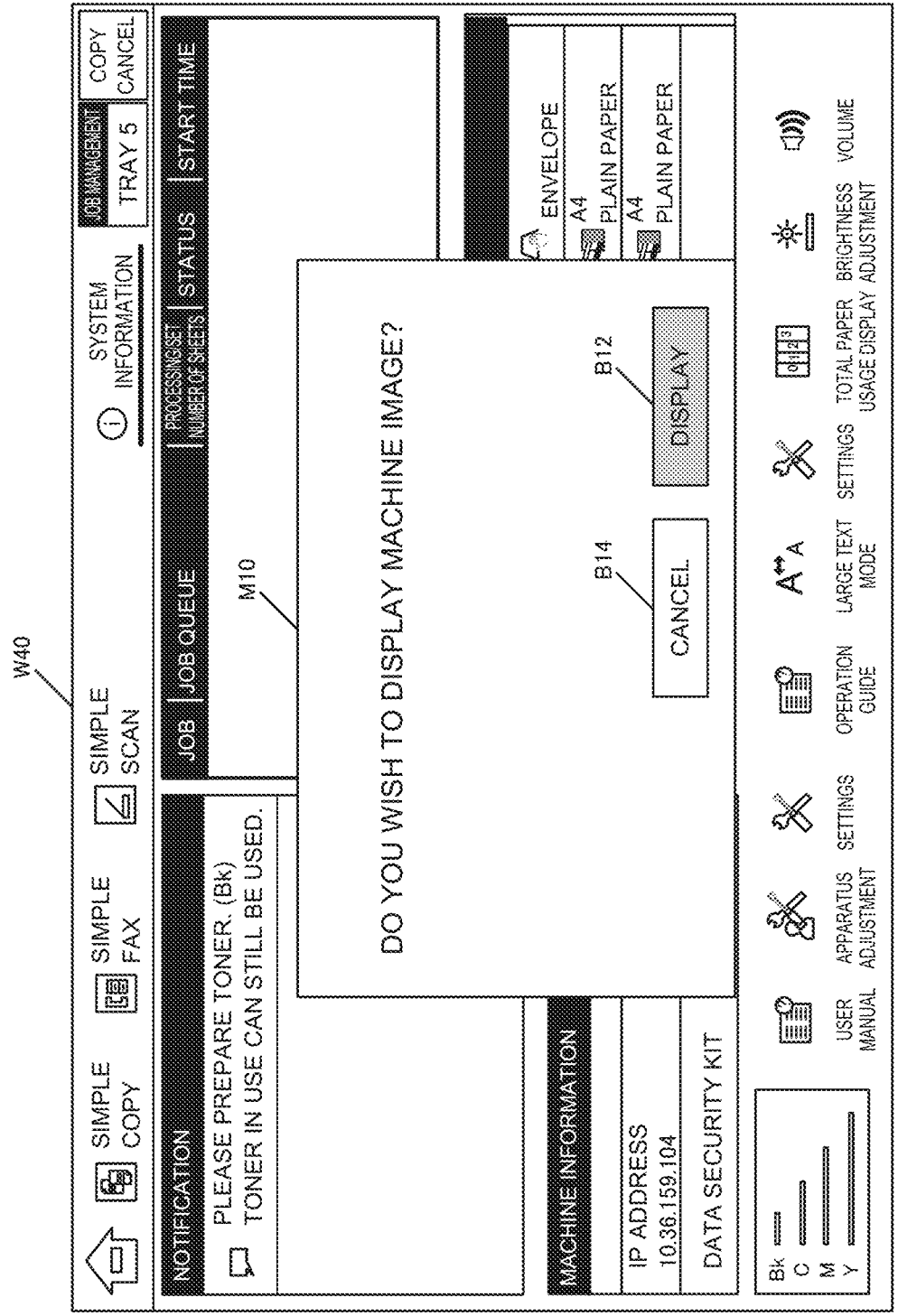
FIG. 10 is a diagram illustrating an operation example according to the second embodiment.

Next, an operation example according to the second embodiment will be described. FIG. 10 is a diagram illustrating a display configuration example of a system information screen W40, which displays an inquiry screen M10 inquiring whether to enable or disable display of a machine image. FIG. 10 shows an operation example corresponding to the processing of step S60 of FIG. 9.

The inquiry screen M10 includes display content which makes an inquiry to the user whether or not to display a machine image, a "Display" button B12, and a "Cancel" button B14.

With respect to the inquiry of whether or not a machine image is to be displayed, the "Display" button B12 is a button to receive input of an instruction to display a machine image. Meanwhile, the "Cancel" button B14 is a button to receive input of an instruction to disable display of the machine image. When the "Display" button B12 is selected by the user, the controller 11 displays the machine image (a machine image display area R210). Meanwhile, when the "Cancel" button B14 is selected by the user, the controller 11 restricts display of the machine image and displays apparatus setting icons (an apparatus setting icon display area R208).

As described above, according to the second embodiment, in addition to the advantages of the first embodiment, it is also possible for the user to set whether to enable or disable the display of the machine image. Thus, an image forming apparatus with more excellent operability can be provided.

3. Third Embodiment

A third embodiment corresponds to an embodiment which includes an acceptor that accepts to receive settings related to display of a machine image, and controls the display of the machine image according to the setting status of constant display of the machine image. In the third embodiment, when constant display of the machine image is set to disabled, display of the machine image is restricted even when execution of a job related to image formation is detected, and if an event which obstructs continuation of the execution of the job related to image formation occurs, the machine image is displayed on a system information screen. Meanwhile, when constant display of the machine image is set to enabled, the machine image is constantly displayed regardless of the detection or non-detection of the execution of the job related to image formation.

3.1 Functional Configuration

Figure 11:
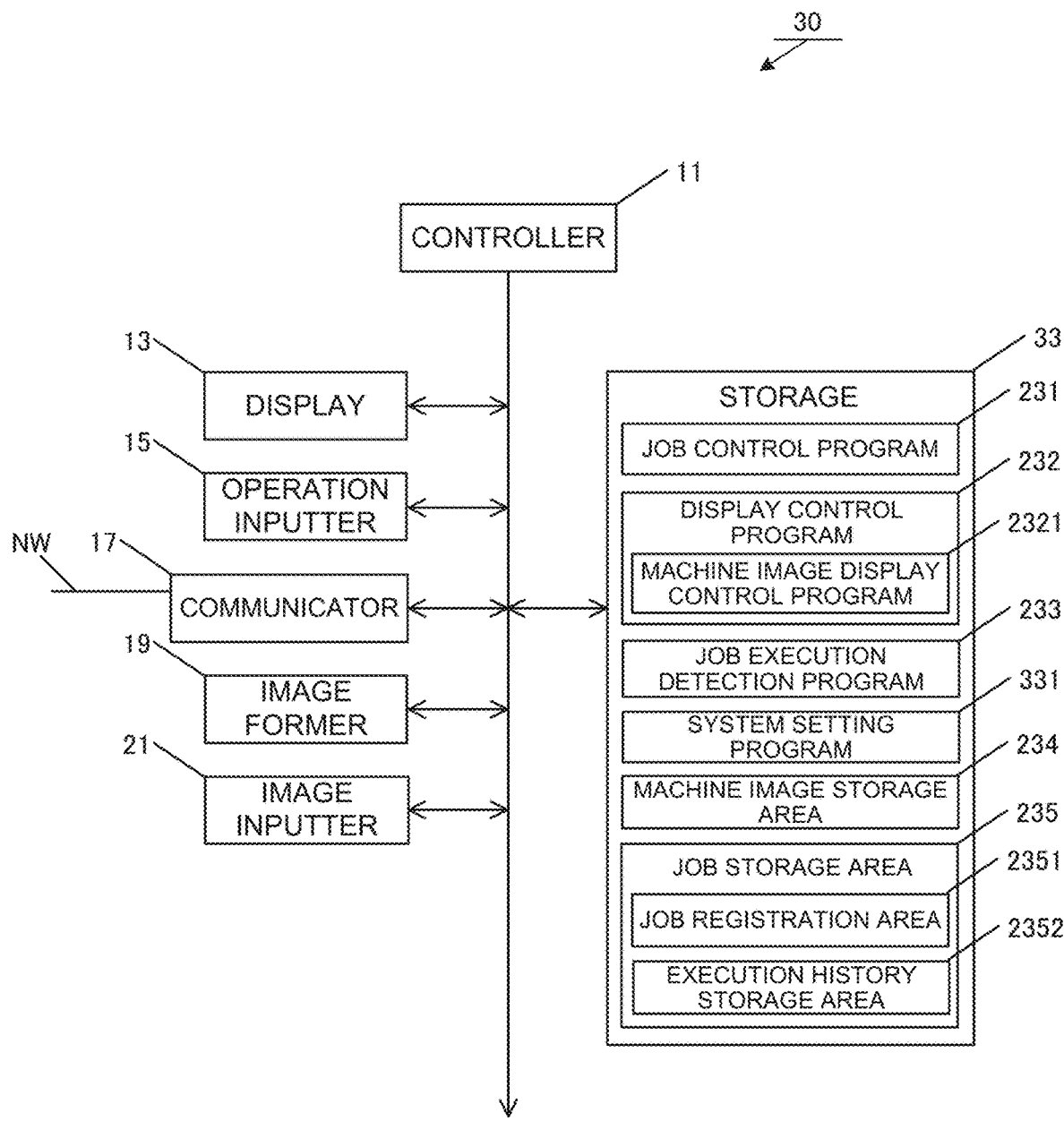
FIG. 11 is a functional configuration diagram of a multifunction peripheral according to a third embodiment.

FIG. 11 is a functional configuration diagram of a multifunction peripheral 30 according to the third embodiment. The multifunction peripheral 30 according to the third embodiment includes a storage 33 in place of the storage 23 of the multifunction peripheral 10 according to the first embodiment. Parts that can be configured the same as the multifunction peripheral 10 according to the first embodiment are denoted by the same reference numerals, and the description thereof is omitted.

In the third embodiment, the storage 33 stores a job control program 231, a display control program 232 (a machine image display control program 2321), a job execution detection program 233, and a system setting program 331, and reserves a machine image storage area 234 and a job storage area 235.

The system setting program 331 is a program that a controller 11 reads in receiving an instruction to make or change apparatus settings, or the like, for the multifunction peripheral 30. The controller 11 that has read the system setting program 331 can function as an acceptor that accepts to receive settings related to display of a machine image. The controller 11 that has read the system setting program 331 receives the settings related to the display of the machine image such as "Constantly display machine image", "Display at the time of job execution", and "Do not display machine image", for example, and controls the display of the machine image on the basis of the received setting content.

3.2 Flow of Processing

Figure 12:
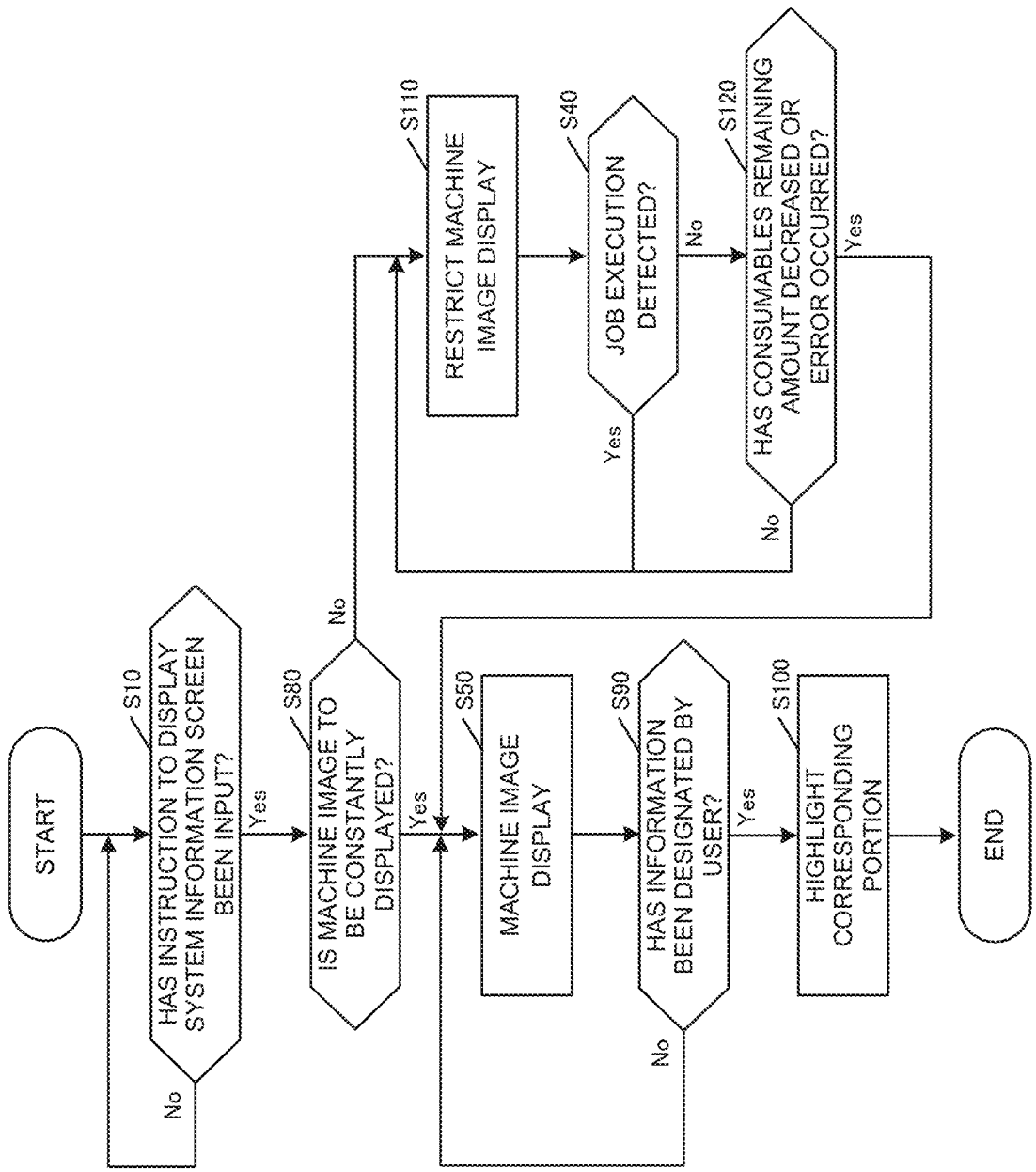
FIG. 12 is a flowchart illustrating a flow of processing according to the third embodiment.

Next, a flow of processing of the third embodiment will be described with reference to a flowchart of FIG. 12. The processing according to the third embodiment is that obtained by replacing the processing of the flowchart of FIG. 4 described in the first embodiment with the flowchart of FIG. 12. Therefore, for parts that can be made the same as the processing described with reference to the flowchart of FIG. 4, the same step numbers as those of the flowchart of FIG. 4 are assigned.

First, the controller 11 determines whether or not an instruction to display a system information screen has been input via a home screen or the like (step S10). If it is determined that an instruction to display a system information screen has been input, the controller 11 determines whether or not display of the machine image is set to constant display (step S10; Yes→step S80). Meanwhile, if it is determined that no instruction to display the system information screen has been input, the controller 11 waits until an instruction to display the system information screen is input (step S10; No).

If it is determined that display of the machine image is not set to constant display, the controller 11 restricts the display of the machine image (a machine image display area R210) on the system information screen (step S80; No→step S110). Next, the controller 11 determines whether or not execution of a job is detected (step S40). If it is determined that job execution is detected, the controller 11 continues the restriction of the display of the machine image (the machine image display area R210) on the system information screen (step S40; Yes→step S110). Meanwhile, if it is determined that job execution is not detected, the controller 11 determines whether or not an event which obstructs continuation of the execution of a job related to image formation has occurred (step S40; No→step S120). The controller 11 assumes decrease in the remaining amount of consumables, such as paper and toner, or occurrence of an error, such as a paper jam, as the target of an event which obstructs the continuation of execution of a job related to image formation, and monitors the decrease in the remaining amount of consumables or the occurrence of an error.

If it is determined that the remaining amount of consumables has been decreased or an error has occurred, the controller 11 displays the machine image (the machine image display area R210) (step S120; Yes→step S50). Meanwhile, if it is determined that there is no decrease in the remaining amount of consumables or occurrence of an error, the controller 11 returns the processing to step S110 (step S120; No→step S110).

Incidentally, if it is determined in step S80 that the display of the machine image is set to constant display, the controller 11 displays the machine image (the machine image display area 8210) on the system information screen regardless of whether execution of the job related to image formation has been detected or not (step S80; Yes→step S50).

Next, the controller 11 determines whether or not specific information has been designated by the user as the operation status of the multifunction peripheral 30 (step S90). If it is determined that the specific information has been designated by the user, the controller 11 highlights a portion reflecting the information designated by the user in the machine image (step S90; Yes→step S100). Meanwhile, if it is not determined that the specific information has been designated by the user, the controller 11 continues to display the machine image (step S90; No→step S50).

3.3 Operation Examples

Figure 13:
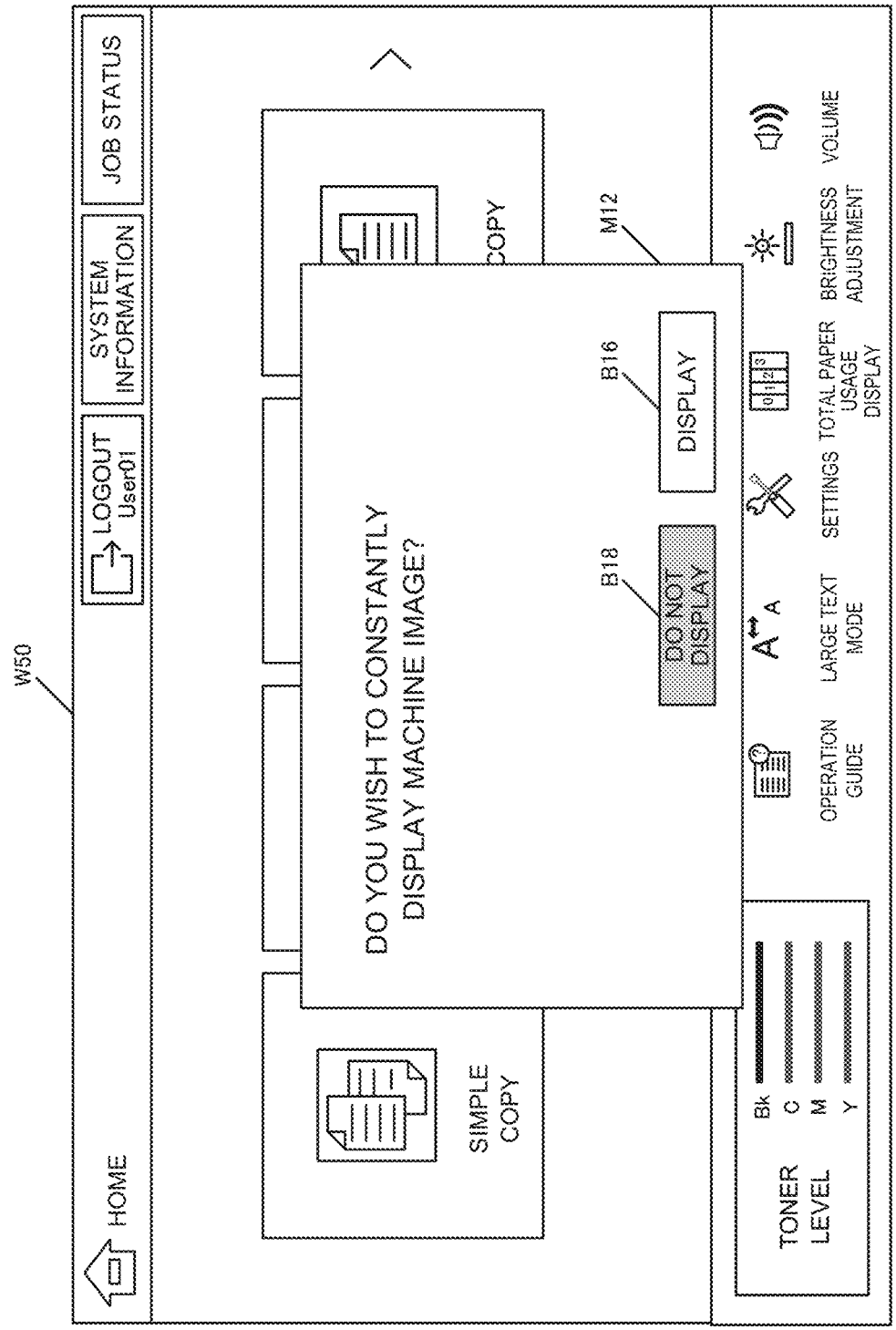
FIG. 13 is a diagram illustrating an operation example according to the third embodiment.

Next, operation examples according to the third embodiment will be described. FIG. 13 is a diagram illustrating a display configuration example of a home screen W50, which displays an inquiry screen M12 inquiring whether to enable or disable constant display of a machine image.

The inquiry screen M12 includes display content which makes an inquiry to the user whether or not to constantly display a machine image, a "Display" button B16, and a "Do not display" button B18.

With respect to the inquiry of whether or not a machine image is to be constantly displayed, the "Display" button B16 is a button to receive input of an instruction to constantly display the machine image. Meanwhile, the "Do not display" button B18 is a button to receive input of an instruction to disable constant display of the machine image. When the "Display" button B16 is selected by the user, the controller 11 constantly displays the machine image regardless of the detection or non-detection of the job execution. Meanwhile, when the "Do not display" button B18 is selected by the user, the controller 11 restricts display of (i.e., hides) the machine image and displays apparatus setting icons. Further, the controller 11 displays the machine image when an event which obstructs continuation of job execution has occurred.

Figure 14:
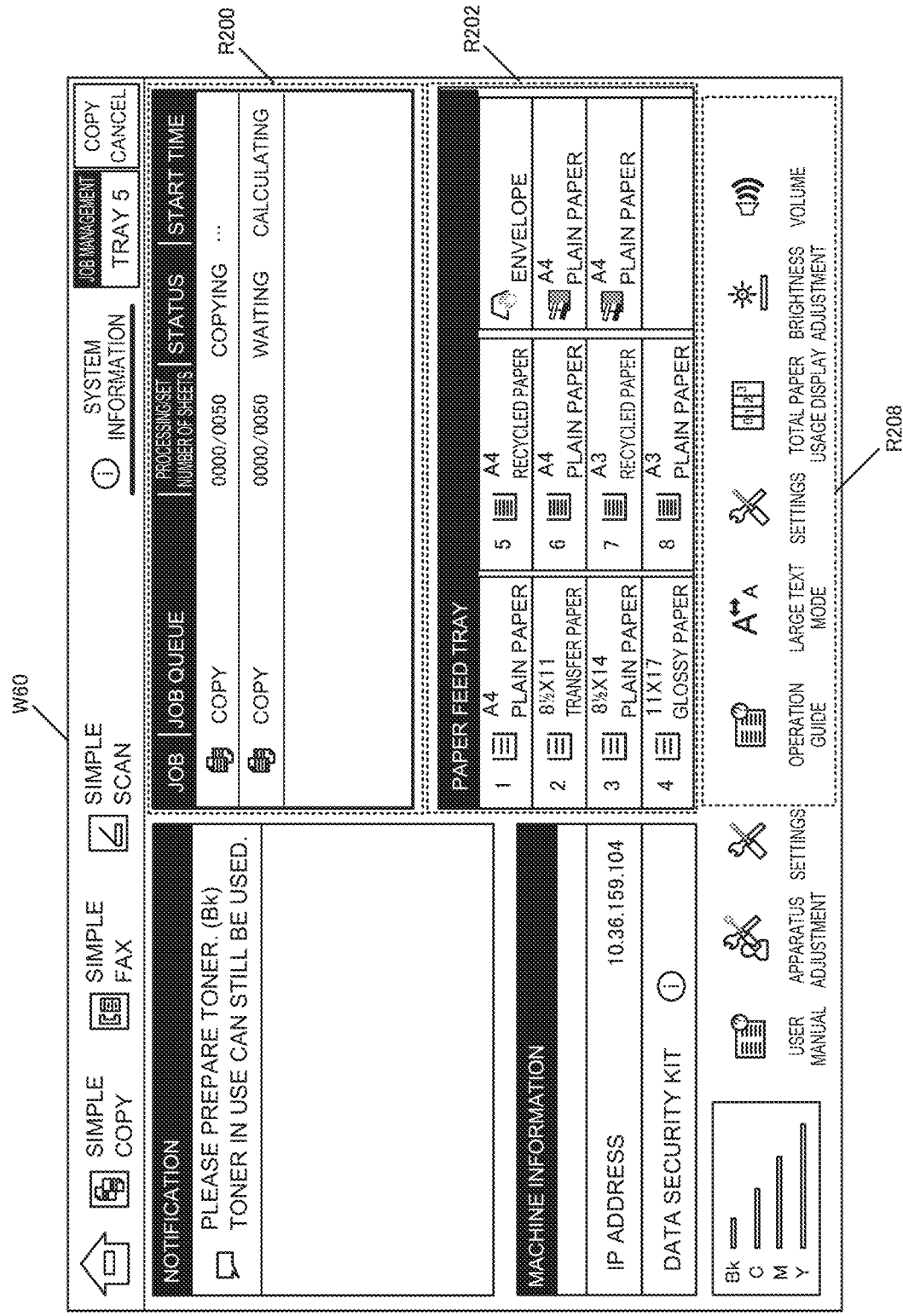
FIG. 14 is a diagram illustrating an operation example according to the third embodiment.

FIG. 14 is a diagram illustrating a display configuration example of a system information screen W60 in a case where constant display of a machine image is set to disabled and job execution is detected. FIG. 14 corresponds to the processing related to step S110 of FIG. 12 to when step S40 is Yes.

When job execution is detected, the controller 11 displays a job queue related to the detected job in a job list display area 8200. FIG. 14 illustrates an example which displays, in the job list display area 8200, a copy job whose execution is detected. However, since constant display of the machine image is set to disabled, the controller 11 restricts the display of the machine image and displays the apparatus setting icons (an apparatus setting icon display area 8208) on the system information screen W60. In a paper feed tray information area 8202, it is also possible to display the paper feed tray in operation according to execution of the job queue in a display mode different from that of the other paper feed trays. In this case, as long as the display mode is that by which the paper feed tray in operation can be distinguished from the other paper feed trays, the display color, the fill pattern, and the like, are not limited. The configuration position of the paper feed tray to be explicitly indicated may be represented by blinking of tray information, a different character font, a different character size, or the like, and the corresponding portion can also be guided by voice guidance.

Figure 15:
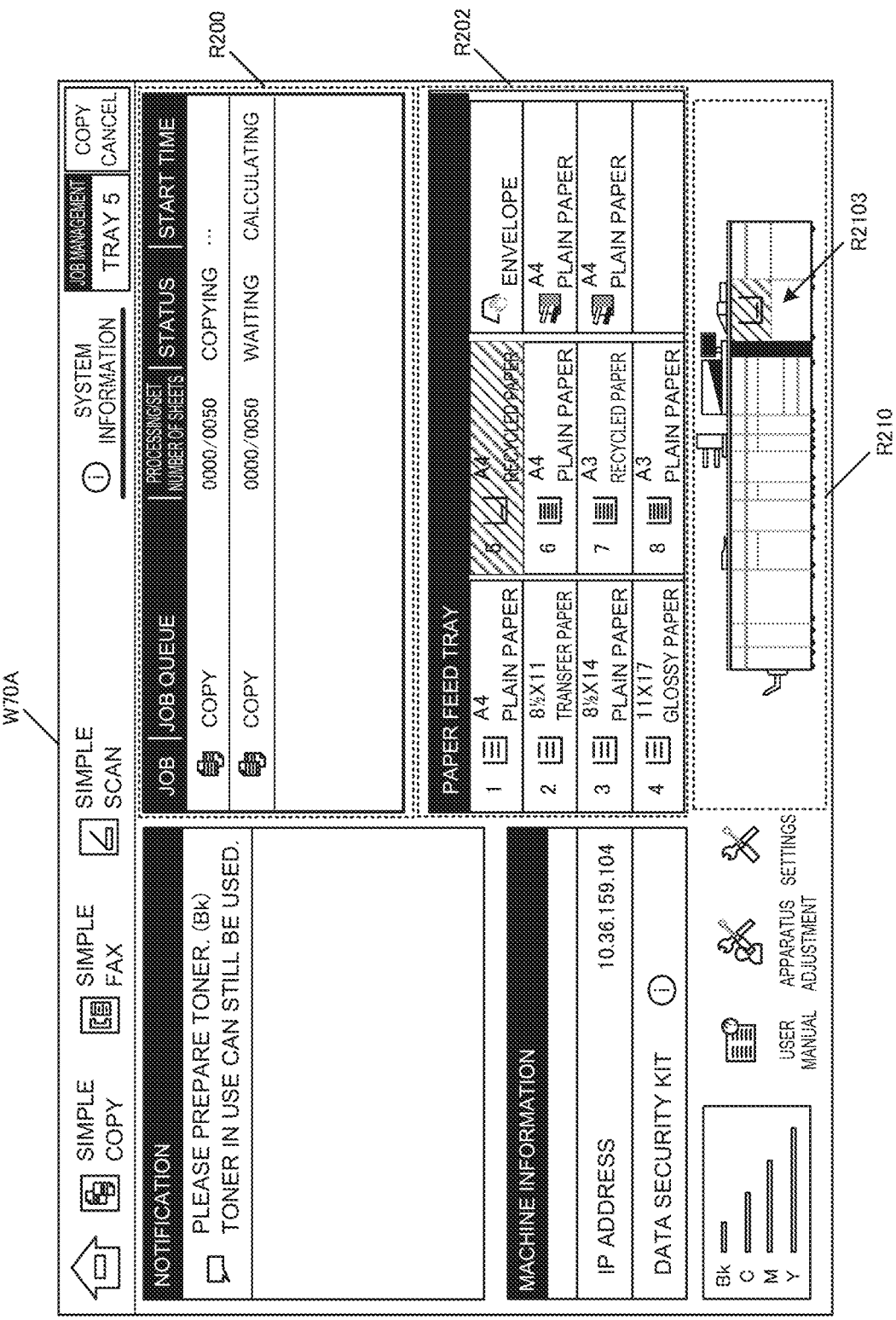
FIG. 15 is a diagram illustrating an operation example according to the third embodiment.

FIG. 15 is a diagram illustrating a display configuration example of a system information screen W70A in a case where constant display of a machine image is set to disabled and an event which obstructs continuation of the job execution has occurred. FIG. 15 corresponds to the processing related to when step S120 of FIG. 12 is Yes to step S50. Here, FIG. 15 illustrates an example of assuming a case where tray 5, which is a paper supply source in a copy job, will soon be out of paper (near-end).

In the system information screen W70A, the controller 11 explicitly indicates that the paper feed tray (tray 5) accommodating the paper to be used for copy in the copy job will soon be out of paper. In the paper feed tray information area R202, as the paper feed tray related to paper feeding, for example, tray 5 is displayed in a display mode different from that of the other paper feed trays. FIG. 15 shows, as the different display mode, a mode in which a display area corresponding to tray 5 is filled with a hatch pattern. As long as the display mode is that by which the paper feed tray related to paper feeding can be identified, the display color, the fill pattern, and the like, are not limited. The configuration position of the paper feed tray to be explicitly indicated may be represented by blinking of tray information, a different character font, a different character size, or the like, and the corresponding portion can also be guided by voice guidance.

In addition to explicit indication of the paper feed tray in the paper feed tray information area R202, the controller 11 displays a machine image in the machine image display area R210, in place of the display of the apparatus setting icon display area R208. In the machine image displayed in the machine image display area R210, a portion R2103 corresponding to the paper feed tray (tray 5), which will soon be out of paper, is highlighted together with an icon representing paper run out. As is the case with the display mode of the paper feed tray in the paper feed tray information area R202, the display mode such as the display color and the fill pattern of the portion R2103 is not particularly limited as long as the paper feed tray related to paper feeding can be identified in the overall configuration of the apparatus. As described above, by highlighting a portion corresponding to the place of occurrence of an event which obstructs continuation of job execution in the machine image, the user can easily ascertain the portion of occurrence of the event.

Figure 16:
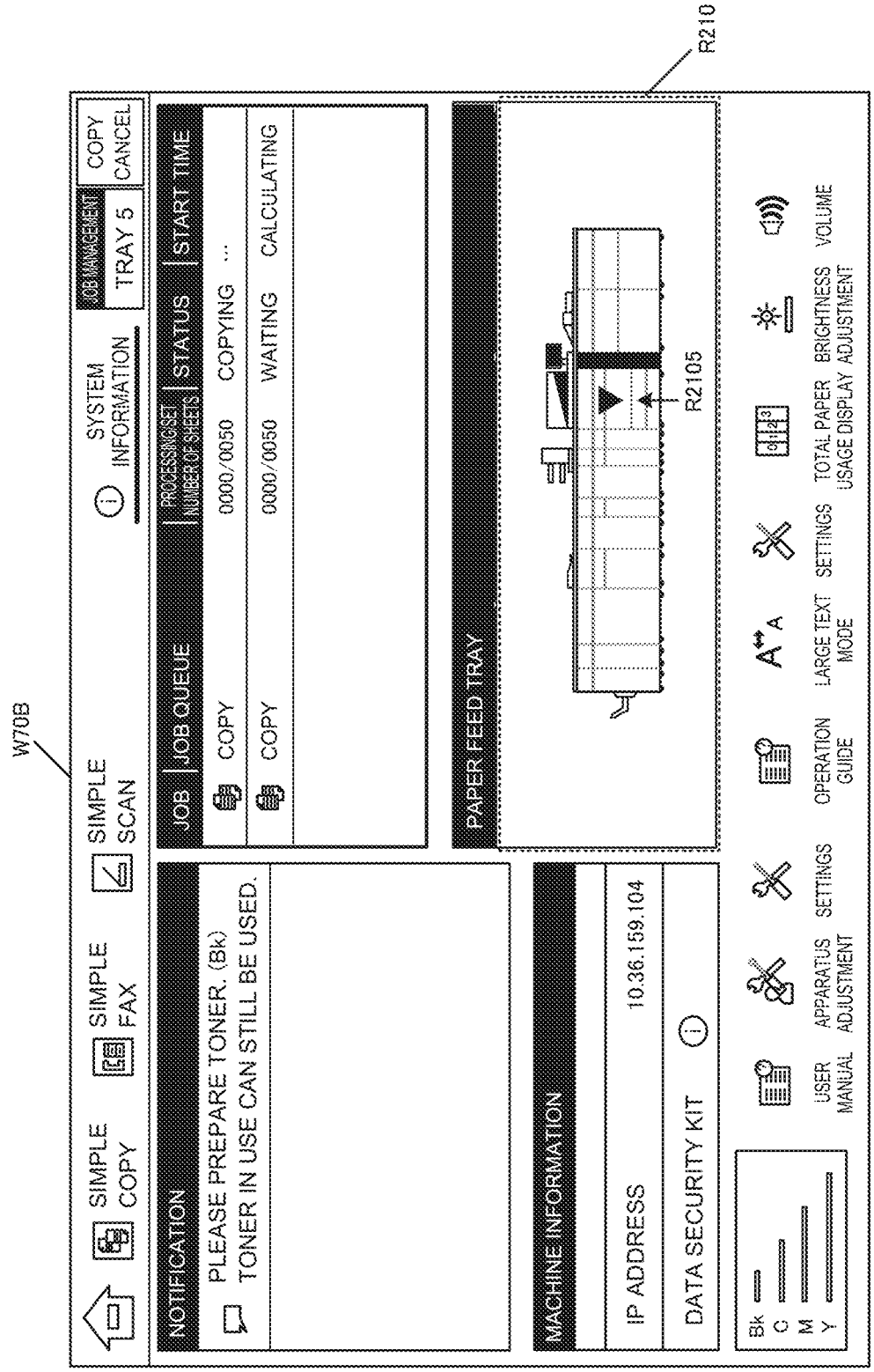
FIG. 16 is a diagram illustrating an operation example according to the third embodiment.

FIG. 16 is a diagram illustrating another display configuration example of a system information screen W70B in a case where constant display of a machine image is set to disabled and an event which obstructs continuation of job execution has occurred. Here, FIG. 16 illustrates an example of assuming a case where an error related to a paper jam has occurred in a copy job.

The controller 11 displays the machine image display area R210. Although the display position of the machine image display area R210 is not particularly limited, for example, the machine image display area R210 can be displayed in the paper feed tray information area R202 that is different from the apparatus setting icon display area R208. In the machine image displayed in the machine image display area R210, a predetermined mark or the like indicating that a paper jam error has occurred is placed at a portion R2105 where the paper jam has occurred. Therefore, it is possible to explicitly indicate the portion where the error (paper jam) has occurred in the overall apparatus configuration.

Figure 17:
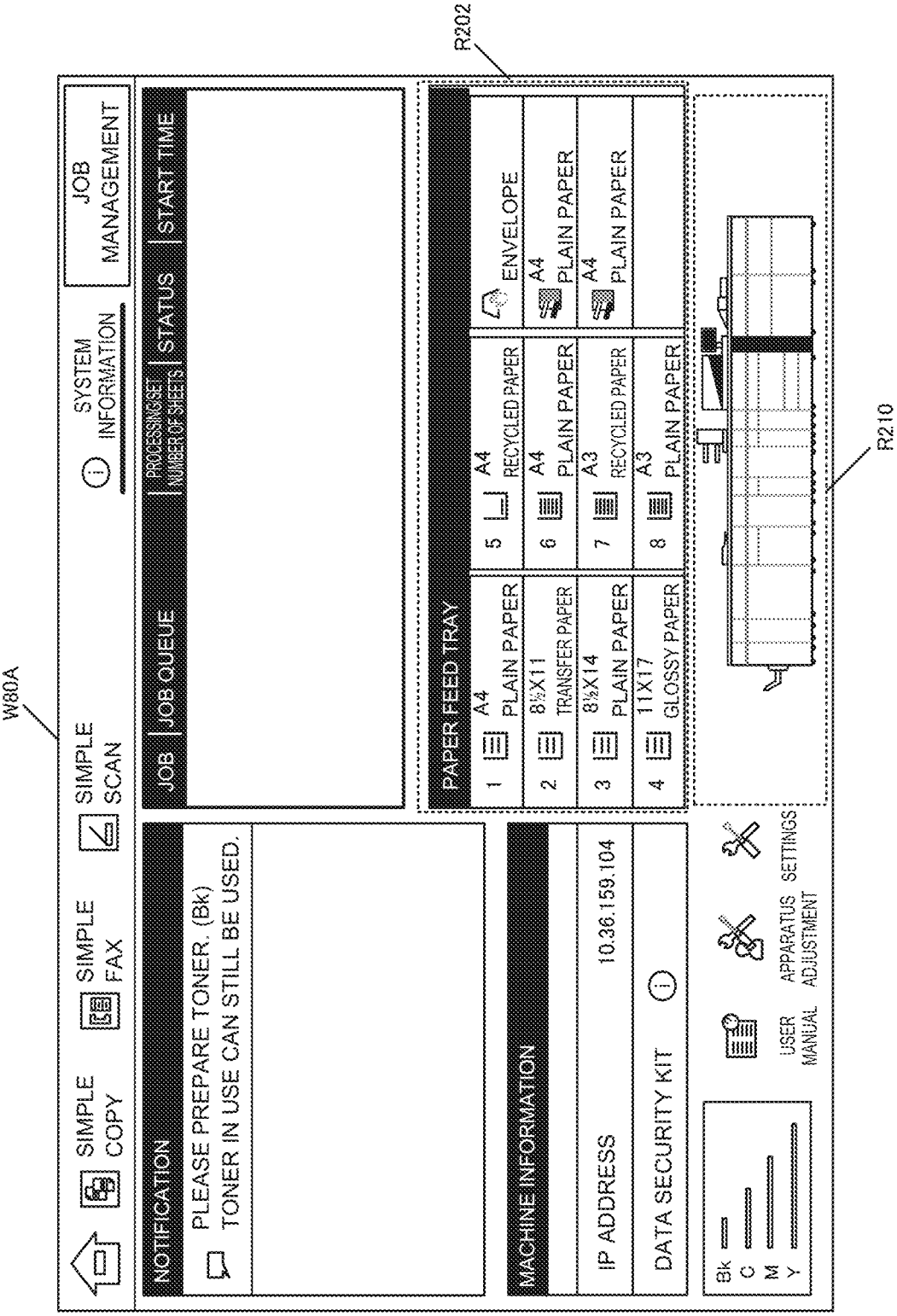
FIG. 17 is a diagram illustrating an operation example according to the third embodiment.

FIG. 17 is a diagram illustrating a display configuration example of a system information screen W80A on which constant display of a machine image is set to enabled, and which displays the machine image (the machine image display area R210) regardless of the detection or non-detection of the job execution. FIG. 17 corresponds to the processing related to when step S80 of FIG. 12 is Yes to step S50.

Figure 18:
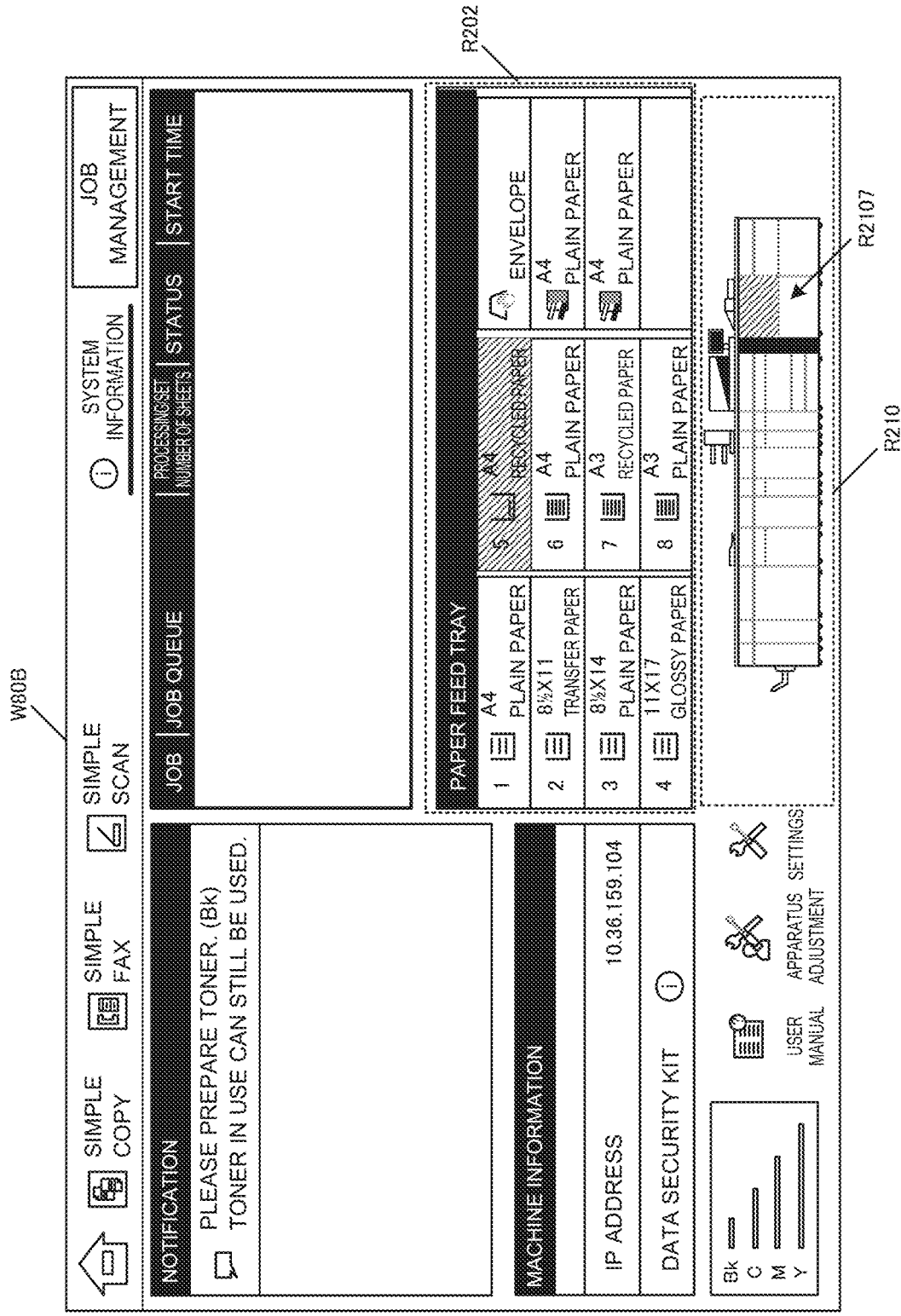
FIG. 18 is a diagram illustrating an operation example according to the third embodiment.

Further, as indicated in a system information screen W80B of FIG. 18, when the user designates a remaining-number-of-sheets-of-paper icon of tray 5 (a hatched portion in FIG. 18) displayed in the paper feed tray information area R202, as the specific information indicating the operation status of the multifunction peripheral 30, the controller 11 highlights a portion R2107 reflecting the information (the remaining-number-of-sheets-of-paper icon of tray 5) designated by the user and notifies the user of the configuration position (mounting position) of tray 5 in the machine image. With such a configuration, for example, the user can easily ascertain the position of the paper feed tray for which paper replenishment is required in the apparatus configuration.

As described above, according to the third embodiment, the display of the machine image is controlled in accordance with the setting of constant display of the machine image, on the basis of a detection result of the execution of a job related to image formation. Therefore, it is possible to provide an image forming apparatus which can provide appropriate apparatus information corresponding to the state of the apparatus. Also, according to the third embodiment, even when constant display of the machine image is set to disabled, the machine image is configured to be displayed on the system information screen if an event which obstructs continuation of the execution of the job related to image formation occurs. Therefore, the user can easily ascertain the event occurring in the apparatus.

In the present disclosure, the embodiment which displays the apparatus configuration diagram depicting the outer appearance of the apparatus on the information screen has been described. Apart from the information screen, the apparatus configuration diagram can also be displayed on the other display screens that the image forming apparatus can display, such as the home screen which receives selection of a job execution mode and the like, and the setting screen (not illustrated) for receiving input of various setting values related to job execution.

The present disclosure is not limited to the above-described embodiments, and various modifications can be made. That is, the technical scope of the present disclosure also includes embodiments that may be obtained by combining technical measures modified as appropriate without departing from the gist of the present disclosure.

Although some parts of the above-described embodiments are separately described for convenience of explanation, it is needless to say that the embodiments may be combined and implemented within a technically allowable range.

Further, the program to be operated on each of the apparatuses in the embodiments is a program that controls the CPU or the like (a program that makes a computer function) so as to implement the functions of the above-described embodiments. The information handled by the apparatuses is temporarily accumulated in a temporary storage device (for example, a RAM) during processing of the information, and then, is stored in various storage devices such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray® disc (BD), or the like), and a magnetic recording medium (for example, a magnetic tape, a flexible disk, or the like). Moreover, not only are the functions of the embodiments described above implemented by execution of a loaded program, but the functions of the present disclosure may also be implemented by processing performed in cooperation with an operating system or other application programs, etc., on the basis of an instruction of the program.

Furthermore, in a case where the programs are to be distributed to the market, the programs may be stored in a portable recording medium for distribution or transferred to a server computer connected via a network, such as the Internet. In this case, a storage device of the server computer is also included in the present disclosure as a matter of course.

What is claimed is:
1. An image forming apparatus comprising:
a display which displays an information screen on which operation statuses of the apparatus are aggregated; and
one or more processors which control a display on the display, wherein
the one or more processors are configured to:
control a display of an apparatus configuration diagram depicting an outer appearance of the apparatus on the information screen based on a detection result of an execution of a job related to an image formation,
restrict the display of the apparatus configuration diagram and display an apparatus setting icon corresponding to an apparatus setting item when:
a display of the apparatus setting item, which receives an input of an apparatus setting, is validated on a basic screen which receives a selection of an execution mode of the job, and
the execution of the job related to the image formation is not detected; and
display the apparatus configuration diagram at a display position of the apparatus setting icon, when:
the display of the apparatus setting item is validated on the basic screen, and
the execution of the job related to the image formation is detected.

2. The image forming apparatus according to claim 1, wherein, with respect to the display of the apparatus configuration diagram, the one or more processors are further configured to highlight a portion corresponding to an acting portion associated with the execution of the job.

3. The image forming apparatus according to claim 1, wherein, when the execution of the job related to the image formation is detected, the one or more processors are further configured to display the apparatus configuration diagram to be superimposed on the apparatus setting icon.

4. The image forming apparatus according to claim 1, wherein, when the execution of the job related to the image formation is detected, the one or more processors are further configured to display a screen inquiring whether to enable or disable the display of the apparatus configuration diagram.

5. The image forming apparatus according to claim 1, further comprising an acceptor that accepts to receive a setting related to the display of the apparatus configuration diagram, wherein
the one or more processors are further configured to:
restrict the display of the apparatus configuration diagram when;
a constant display of the apparatus configuration diagram is set to be disabled, and
the execution of the job related to the image formation is detected; and
display the apparatus configuration diagram on the information screen when;
the constant display of the apparatus configuration diagram is set to be disabled, and
an event which obstructs a continuation of the execution of the job related to the image formation has occurred.

6. The image forming apparatus according to claim 5, wherein the event, which obstructs the continuation of the execution of the job related to the image formation, is a decrease in a remaining amount of consumables or occurrence of an error pertaining to the image formation.

7. The image forming apparatus according to claim 5, wherein the one or more processors are further configured to:
display the apparatus configuration diagram on the information screen, regardless of the detection or the non-detection of the execution of the job related to the image formation, when the constant display of the apparatus configuration diagram is set to be enabled; and
highlight a portion reflecting information indicating an operation status of the apparatus designated by a user, with respect to the display of the apparatus configuration diagram.

8. A display control method comprising:
displaying, on a display device, an information screen on which operation statuses of an apparatus are aggregated;
controlling a display on the display device, wherein controlling the display comprises:
controlling a display of an apparatus configuration diagram depicting an outer appearance of the apparatus on the information screen based on a detection result of an execution of a job related to an image formation;
restricting the display of the apparatus configuration diagram and displaying an apparatus setting icon corresponding to the apparatus setting item when:
a display of the apparatus setting item, which receives an input of an apparatus setting, is validated on a basic screen which receives a selection of an execution mode of the job, and
the execution of the job related to the image formation is not detected; and
display the apparatus configuration diagram at a display position of the apparatus setting icon, when:
the display of the apparatus setting item is validated on the basic screen, and
the execution of the job related to the image formation is detected.

* * * * *